April 21, 1931.   W. W. KNIGHT   1,802,177
GASKET
Filed July 14, 1928
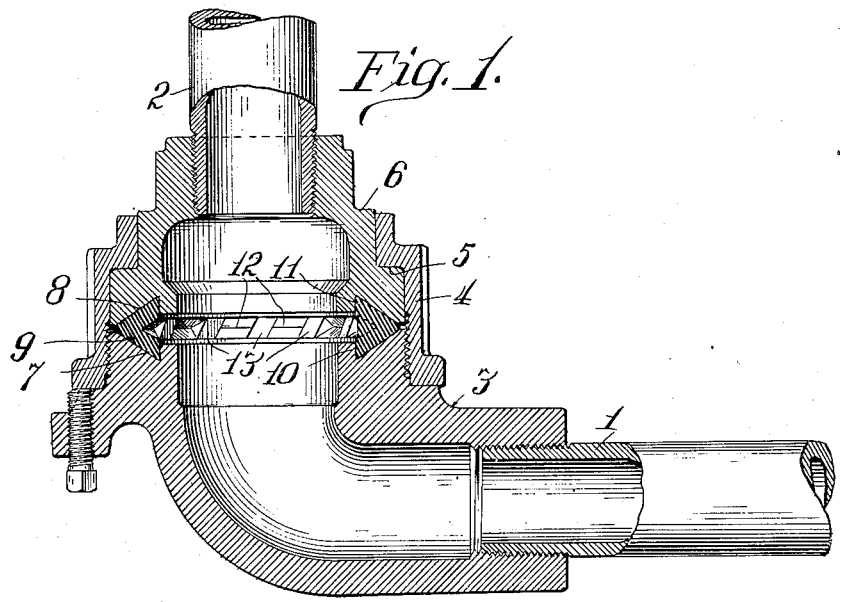
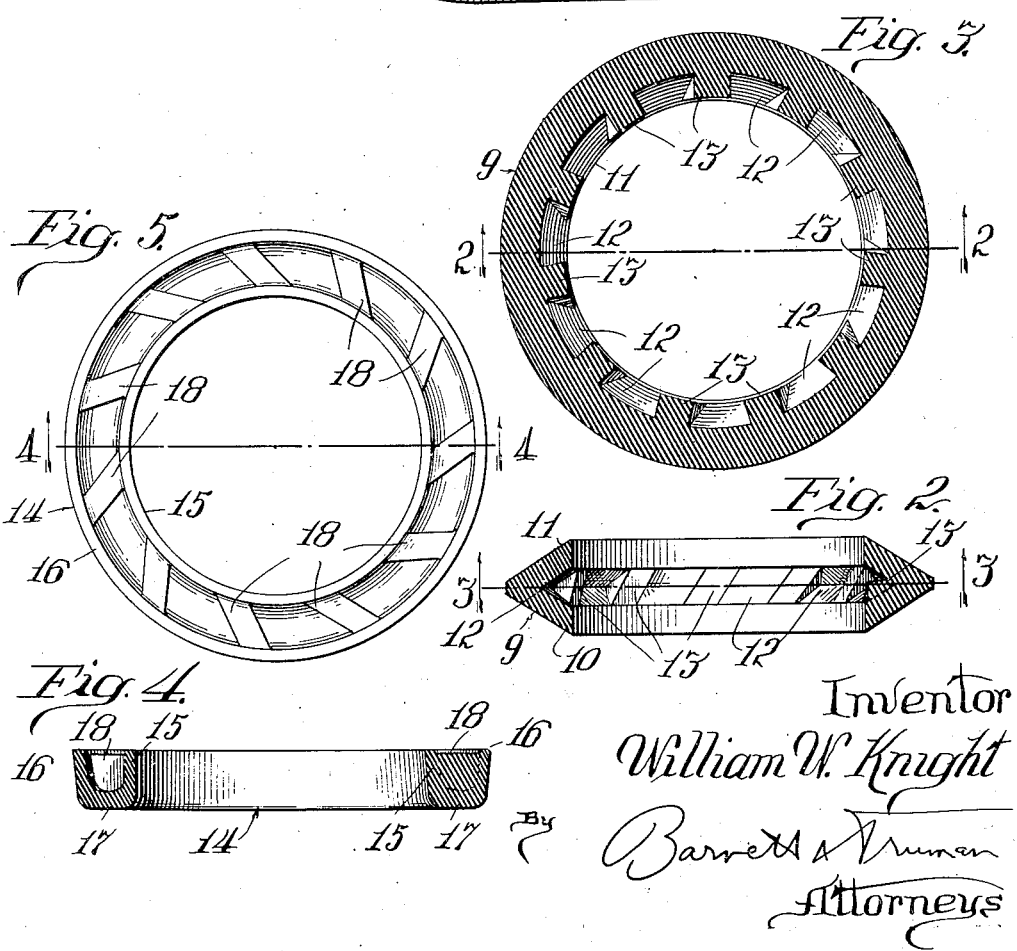
Inventor
William W. Knight
By Barrett A Truman
Attorneys Patented Apr. 21, 1931

1,802,177

UNITED STATES PATENT OFFICE

WILLIAM W. KNIGHT, OF EVANSTON, ILLINOIS, ASSIGNOR TO ROTH RUBBER COMPANY, OF CICERO, ILLINOIS, A CORPORATION OF ILLINOIS

GASKET

Application filed July 14, 1928. Serial No. 292,895.

This invention relates to new and useful improvements in gaskets and more particularly to an improved form of annular rubber gasket adapted to maintain a fluid-tight joint between two relatively movable members.

This improved gasket is hollow and the spaced side walls are yieldably held apart by a plurality of ribs positioned between and connecting the side walls, the ribs extending diagonnally across the space between the side walls. These diagonal ribs serve to yieldably hold the walls apart, without unduly diminishing the resiliency of the side walls at any localized points.

The general object of this invention is to provide an improved gasket of the form briefly described hereinabove, and disclosed more in detail in the description which follows.

Other objects and advantages of the invention will be more apparent from the following detailed description of certain approved forms of gaskets involving the principles of this invention.

In the accompanying drawings:

Fig. 1 is a central section through a swiveled pipe joint, equipped with one of these improved gaskets.

Fig. 2 is a central vertical section through one of the gaskets, the view being taken substantially on the line 2—2 of Fig. 3.

Fig. 3 is a central horizontal section through one of the gaskets, the view being taken substantially on the line 3—3 of Fig. 2.

Fig. 4 is a sectional view, similar to Fig. 2, showing a different form of gasket involving the principles of this invention.

Fig. 5 is a plan view of the gasket shown in Fig 4.

In Fig. 1 is shown a swiveled pipe joint connecting the two pipe sections 1 and 2. On member 3 of this joint is screwed a collar 4 which overlaps a shoulder 5 on the other member 6 of the joint, so as to hold the members 3 and 6 together, but permit relative rotation therebetween. The adjacent faces of the members 3 and 6 are recessed at 7 and 8 to receive the resilient annular gasket 9, of triangular cross section. This gasket 9 comprises two opposite side walls 10 and 11 which join at the outer circumferential edge of the gasket, but diverge radially inward so as to leave an open space therebetween. The gasket is clamped snugly between the members 3 and 6 by screwing down the collar 4, and the gasket is also expanded against the metallic joint members by the fluid pressure wthin the pipe joint acting within the space 12 between the side members of the gasket.

In some installations, there is a great variation in the pressure within the joint at different times, and under certain conditions the internal pressure within the joint is not sufficient to keep the side members of the gasket properly expanded unless bracing means is provided within the space 12 between the side walls 10 and 11. For example, in apparatus used in the process of bakelite molding, this pipe connection at times contains steam and at other times cold water, so that the internal pressure varies from approximately 150 pounds down to a very low pressure. Under such conditions, it has been found that these gaskets will not maintain a fluid-tight connection unless bracing means is provided between the side walls of the gasket. According to this invention, diagonally disposed ribs 13 connect the side walls 10 and 11 at intervals, these ribs being formed integrally with the remainder of the gasket of rubber or other suitable resilient material. If these ribs were disposed perpendicularly to the side walls, the gasket would be difficult to compress at those locations where the ribs were disposed, and much easier to compress between the ribs, so that humps would be formed, thus decreasing the efficiency of the gasket. By disposing the ribs diagonally on the space 12, the rib is not compressed longitudinally to as great an extent, but is deflected laterally, thereby increasing the resiliency of the gasket, while at the same time stiffening same sufficiently to avoid collapsing of the side walls under all conditions.

The use of this invention is not limited to the specific type of gasket disclosed in Figs. 1, 2 and 3. In Figs. 4 and 5, is shown a different type of gasket 14 adapted for use in an annular recess in a piston to form fluid-tight connection with the side walls of a cylinder, for example in a hydraulic press. This gasket comprises inner and outer annular side walls 15 and 16, connected by a radial bottom wall 17. The side walls 15 and 16 are connected by diagonally disposed ribs 18 which function the same as in the first described modification, to brace the side walls without materially interfering with the resiliency at the locations connected by the ribs.

While these gaskets are preferably formed of rubber, or a rubber composition, other resilient material might be used. Also the gaskets might be made in other forms than those here shown by way of example, without departing from the principles of this invention as set forth in the following claims.

I claim:

1. A hollow flexible gasket comprising spaced side walls connected by diagonally disposed ribs.

2. A hollow annular rubber gasket comprising side walls connected at the outer circumference of the gasket and diverging radially inward, and a plurality of ribs interposed between and connecting the side walls and extending diagonally across the space between the walls.

3. A hollow annular rubber gasket comprising side walls connected at the outer circumference of the gasket and diverging radially inward, and a plurality of ribs integrally joined at their ends to the side walls and interposed between and connecting the side walls, the ribs extending diagonally across the space between the walls so as to form acute angles therewith.

WILLIAM W. KNIGHT.